(12) United States Patent
Tamaru

(10) Patent No.: US 7,099,061 B2
(45) Date of Patent: Aug. 29, 2006

(54) IMAGE-FORMING DEVICE AND SCANNING UNIT FOR USE THEREIN

(75) Inventor: Yasuo Tamaru, Nagoya (JP)

(73) Assignee: Brother Kogyo Kabushiki Kaisha, (JP)

( * ) Notice: Subject to any disclaimer, the term of this patent is extended or adjusted under 35 U.S.C. 154(b) by 90 days.

(21) Appl. No.: 11/185,723

(22) Filed: Jul. 21, 2005

(65) Prior Publication Data

US 2006/0017996 A1   Jan. 26, 2006

(30) Foreign Application Priority Data

Jul. 21, 2004   (JP)   ............... 2004-213576

(51) Int. Cl.
G02B 26/08   (2006.01)
(52) U.S. Cl. ............... 359/204; 359/206; 359/216; 347/243
(58) Field of Classification Search ........ 359/204–206; 347/243–244
See application file for complete search history.

(56) References Cited

U.S. PATENT DOCUMENTS 6,052,211 A * 4/2000 Nakajima ............... 359/204

6,201,561 B1 * 3/2001 Ichikawa ............... 347/241
6,801,239 B1   10/2004 Nakahata
2003/0052961 A1   3/2003 Kaiho
2003/0197912 A1   10/2003 Takakubo
2004/0109211 A1 * 6/2004 Kato

FOREIGN PATENT DOCUMENTS

| JP | 10-020224 | 1/1998 |
|----|-----------|--------|
| JP | 10-221617 | 8/1998 |
| JP | 2000-267031 | 9/2000 |
| JP | 2004-21133 | 1/2004 |

* cited by examiner

Primary Examiner—James Phan
(74) Attorney, Agent, or Firm—Banner & Witcoff Ltd.

(57) ABSTRACT

A scanning unit for use in an image-forming device includes, for example, four light sources that emit light beams corresponding to yellow, magenta, cyan and black images. The light beams are scanned over the corresponding photosensitive drum with the use of a single polygon mirror and four optical reflection systems each including reflection mirrors. The curved orientation of the scan lines on the photosensitive drum can be equalized for all four light beams by regulating the number of reflection mirrors, that is, by setting the number of reflection mirrors to an even number or an odd number.

14 Claims, 4 Drawing Sheets

IMAGE-FORMING DEVICE AND SCANNING UNIT FOR USE THEREIN

BACKGROUND OF THE INVENTION

1. Field of the Invention

The present invention relates to a scanning unit for used in an image-forming device, and more particularly to a scanning unit including a polygon mirror for scanning light beams, the polygon mirror having a plurality of reflecting surfaces on which a plurality of light beams are obliquely incident from different positions in a subscanning direction.

2. Description of the Related Art

In a laser printer or other electrophotographic image-forming device, a light source such as a semiconductor laser emits a light beam that is deflected by a polygon mirror or other deflecting means onto a photosensitive member, the surface of which has a uniform charge, so as to form an electrostatic latent image on the surface of the photosensitive member by scanning the light beam thereon. The latent image is subsequently developed into a visible image with toner, and the toner image is transferred onto a recording medium, such as a sheet of paper, to form an image on the recording medium.

Conventional image-forming devices form color images by superimposing toner images in the colors cyan (C), magenta (M), yellow (Y), and black (K). Color image-forming devices that employ the tandem system are provided with a plurality of image-carrying members (photosensitive drums or the like), one for each color. The surface of each image-carrying member is exposed by a light beam according to image data corresponding to each color image, forming a latent image that is subsequently developed with toner. The toner images of each color are then transferred sequentially and superimposed over one another on an intermediate transfer medium or a paper or other recording medium, thereby forming a color image.

When the image-forming device includes a plurality of image-carrying members as in the tandem system (or scans a single image-carrying member at different exposure positions) to form color images by sequentially superimposing toner images in each color, problems in color registration can occur when the shape of the scan lines for each color do not match, resulting in a loss of image quality. Color registration is particularly difficult when light beams are irradiated so as to be obliquely incident on the reflecting surfaces of the polygon mirror, because the distance that the light beam travels from the reflecting surface to the fθ lens is different than when the light beam is not obliquely incident and produces a curved scan line.

Japanese Patent Application Publication No. 10-221617 describes an optical scanning device employing polygon mirrors to deflect a plurality of light beams emitted from light sources corresponding to each color. In this technology, the optical scanning device employs two polygon mirrors, and light beams are emitted so as to be obliquely incident on the front surface and rear surface sides of each polygon mirror. Optical reflecting systems corresponding to each of the plurality of light beams reflected off the reflecting surfaces of the polygon mirrors are configured of reflecting mirrors or other reflective optical reflecting elements for guiding the respective light beams to the corresponding image-carrying members in order to expose the surfaces of the image-carrying members.

In the technology described in Japanese Patent Application Publication No. 10-221617, the number of reflective optical reflecting elements constituting each optical reflecting system is adjusted so that all light beams expose the photosensitive members from the same side in order to produce uniform scan line curves.

However, there has been much demand in recent years to produce more compact image-forming devices, such as the tandem type color image-forming devices described above for forming color images using a plurality of image-carrying members. Here, the use of two polygon mirrors as described in Japanese Patent Application Publication No. 10-221617 does not contribute to the production of a more compact device

SUMMARY OF THE INVENTION

In view of the foregoing, it is an object of the present invention to provide an image-forming device and a scanning unit provided in the image-forming device that irradiate light beams so as to be obliquely incident on reflecting surfaces of a polygon mirror, while achieving a more compact size.

To achieve the above and other objects, there is provided a scanning unit that includes a polygon mirror; a first plurality of light sources, a second plurality of light sources; a first fθ lens; a second fθ lens; and first to fourth optical reflecting systems. The polygon mirror is rotatable about a rotational axis and has a plurality of reflecting surfaces including first and second reflecting surfaces, and an imaginary plane. The imaginary plane is orthogonal to the rotational axis, intersects the plurality of reflecting surfaces, and divides a spatial area in which the polygon mirror is disposed into a first part and a second part.

The first plurality of light sources is disposed in the first part and irradiates one or more light beams diagonally toward the second part to strike each of the first and second reflecting surfaces of the polygon mirror. The second plurality of light sources is disposed in the second part and irradiates one or more light beams diagonally toward the first part to strike each of the first and second reflecting surfaces of the polygon mirror. The first fθ lens transmits the light beams reflected off the first reflection surface, and the second fθ lens transmits the light beams reflected off the second reflection surface. The first optical reflecting system includes a predetermined number of optical reflecting elements successively disposed along an optical path between the first fθ lens and a first position. The second optical reflecting system includes a predetermined number of optical reflecting elements successively disposed along an optical path between the first fθ lens and a second position. The third optical reflecting system includes a predetermined number of optical reflecting elements successively disposed along an optical path between the second fθ lens and a third position. The fourth optical reflecting system includes a predetermined number of optical reflecting elements successively disposed along an optical path between the second fθ lens and a fourth position.

The light beams emanated from the first plurality of light sources and irradiated onto the first reflecting surface of the polygon mirror are incident on the first fθ lens. The light beams emanated from the second plurality of light sources and irradiated onto the first reflecting surface of the polygon mirror are incident on the first fθ lens. The light beams emanated from the first plurality of light sources and irradiated onto the second reflecting surface of the polygon mirror are incident on the second fθ lens. The light beams emanated from the second plurality of light sources and irradiated onto the second reflecting surface of the polygon mirror are incident on the second fθ lens. If the first optical reflecting system includes an odd number of optical reflecting elements, each of the second and third optical reflecting systems includes an even number of optical reflecting elements and the fourth optical reflecting system includes an odd number of optical reflecting elements whereas if the first optical reflecting system includes an even number of optical reflecting elements, each of the second and third optical reflecting systems includes an odd number of optical reflecting elements and the fourth optical reflecting system includes an even number of optical reflecting elements.

An image-forming device according to the present invention includes the scanning unit described above and a plurality of photosensitive members including first to fourth photosensitive members wherein the first to fourth photosensitive members are to be disposed in the first to fourth positions, respectively.

In accordance with the present invention, since a single polygon mirror is used for scanning a plurality of light beams, it is possible to produce a more compact image-forming device. Further, the curved orientation of the scan lines can be equalized for all the light beams by regulating the number of optical reflecting elements (setting them to an even number or an odd number) constituting the optical reflecting system corresponding to each of the plurality of light beams. Specifically, when an odd number of optical reflecting elements are used to configure the optical reflecting system that guides a light beam incident on the first fθ lens in, for example, a downward direction, then an odd number of optical reflecting elements is also used to configure the optical reflecting system that guides a light beam incident on the second fθ lens in an upward direction, while the remaining optical reflecting systems are configured of an even number of optical reflecting elements.

Conversely, when an even number of optical reflecting elements are used to configure the optical reflecting system that guides a light beam incident on the first fθ lens in a downward direction, then an even number of optical reflecting elements is also used to configure the optical reflecting system that guides a light beam incident on the second fθ lens in an upward direction, while the remaining optical reflecting systems are configured of an odd number of optical reflecting elements.

By regulating the number of optical reflecting elements, as described above, the scan lines formed on the surfaces of the photosensitive members can be made to curve in the same direction, thereby restraining errors in registration while achieving a compact device. To improve image quality when a plurality of light beams are obliquely incident on reflecting surfaces of the polygon mirror from different directions vertically, the angle formed by these different beams should be small. However, when the angle between different beams is set small, it is difficult to separate the beams after they are reflected off the polygon mirror in order to guide the beams to the appropriate optical reflecting system.

When the optical reflecting elements provided at initial positions in the second and/or fourth optical reflecting systems for guiding light beams obliquely incident on a reflecting surface of the polygon mirror and reflected upward (first optical reflecting elements) are disposed closer to the reflecting surface than optical reflecting elements at initial positions in optical reflecting systems that guide the other light beams reflected downward off the same reflecting surfaces of the polygon mirror (second optical reflecting elements), it is preferable that the first optical reflecting elements be configured so as not to interfere with the passage of the other light beams because the other light beams can produce stray light when reflected by the second and fourth optical reflecting systems.

As described above, the image-forming device and scanning unit of the present invention employ a single polygon mirror to scan a plurality of light beams, and form scan lines on the surfaces of photosensitive members so that the scan lines curve in the same direction. Accordingly, the image-forming device and scanning unit of the present invention can be made compact, while suppressing errors in color registration.

BRIEF DESCRIPTION OF THE DRAWINGS

The particular features and advantages of the invention as well as other objects will become apparent from the following description taken in connection with the accompanying drawings, in which.

DETAILED DESCRIPTION OF THE EMBODIMENTS

A color laser printer according to an embodiment of the invention will be described with reference to the accompanying drawings. In the following description, the terms "upward", "downward", "upper", "lower", "above", "below" and the like will be used throughout the description assuming that the color laser printer is disposed in an orientation in which it is intended to be used. In use, the printer is disposed as shown in FIG. 1.

(1) Overall structure of a color laser printer

Figure 1:
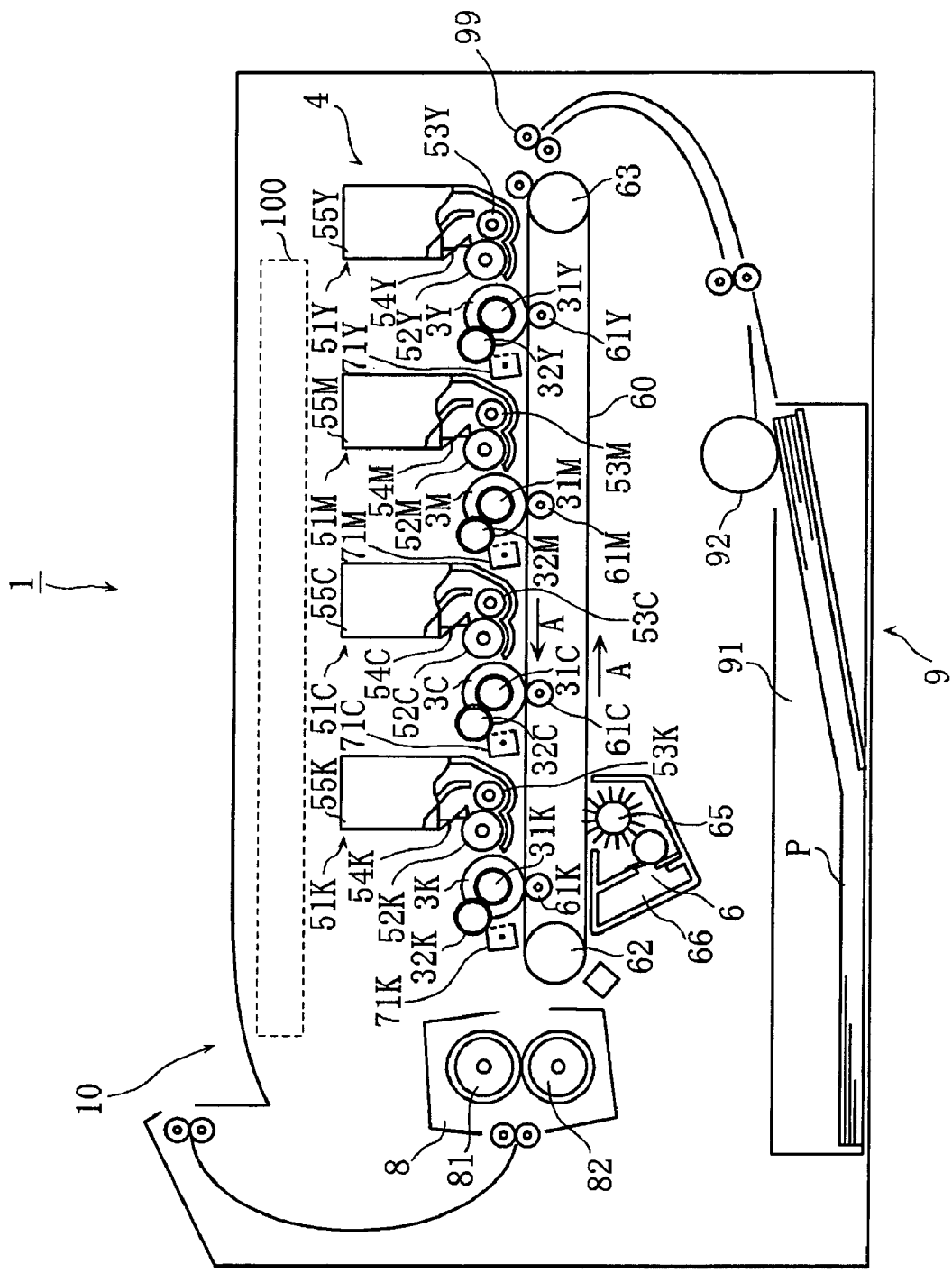
FIG. 1 is a vertical cross-sectional view showing a color laser printer.

FIG. 1 is a side cross-sectional view showing the structure of a color laser printer serving as the color image-forming device according to the present invention.

A color laser printer 1 is a tandem type color image-forming device for forming color images on a recording medium, such as a recording paper P. The color laser printer 1 includes photosensitive drums 3Y, 3M, 3C, and 3K (hereinafter also referred to as the "photosensitive drums 3") corresponding to the colors yellow (Y), magenta (M), cyan (C), and black (K). The photosensitive drums 3 sequentially superimpose toner images of their respective colors on the recording paper P, as the recording paper P is conveyed on a paper conveying belt 60.

The color laser printer 1 also includes a toner image forming unit 4, a fixing unit 8, a paper supplying unit 9, a paper discharge tray 10, and a scanning unit 100. The paper supplying unit 9 supplies sheets of the recording paper P to the toner image forming unit 4, and the toner image forming unit 4 forms color images on the recording paper P. Subsequently, the fixing unit 8 fixes the image to the recording paper P, and the recording paper P is discharged onto the paper discharge tray 10.

The paper supplying unit 9 is disposed in the bottommost section of the color laser printer 1 and includes a paper cassette 91 for accommodating the recording paper P or other recording medium, and a feeding roller 92 for conveying sheets of the recording paper P onto a paper conveying path. The feeding roller 92 is driven to supply the recording paper P at a prescribed timing synchronized with components in the toner image forming unit 4. The sheets of recording paper P supplied from the paper supplying unit 9 are conveyed onto the paper conveying belt 60 by a pair of conveying rollers 99.

The toner image forming unit 4 sequentially forms toner images in each color on the sheet of recording paper P supplied from the paper supplying unit 9 as the recording paper P is conveyed on the paper conveying belt 60. The paper conveying belt 60 is looped about a drive roller 62 and a follow roller 63. A drive motor (not shown) drives the drive roller 62 to rotate so that the paper conveying belt 60 moves in the direction indicated by an arrow A in FIG. 1. The toner image forming unit 4 is configured of separate units for each color that sequentially transfer images in their respective colors onto the recording paper P conveyed on the paper conveying belt 60 in order to form a color image thereon.

A cleaning unit 6 is disposed on the underside of the paper conveying belt 60. The cleaning unit 6 includes a scraping member 65 for scraping toner remaining on the surface of the paper conveying belt 60, and a residual toner case 66 for collecting toner scraped off the paper conveying belt 60 by the scraping member 65.

In addition to the photosensitive drums 3 mentioned above, the toner image forming unit 4 includes chargers 71Y, 71C, 71M, and 71K (hereinafter referred to as "chargers 71") and developing units 51Y, 51C, 51M, and 51K (hereinafter referred to as "developing units 51") in the corresponding toner image forming units corresponding to each of the toner colors yellow, magenta, cyan, and black. Hereinafter, the colors yellow, magenta, cyan, and black will be represented by the letters Y, M, C, and K, and components related to each color will have the letters Y, M, C, and K appended to their reference numeral to indicated the corresponding color.

The units of each color configuring the toner image forming unit 4 are arranged above the paper conveying belt 60 one after another beginning from the upstream side of the paper conveying path in order to form toner images in the order Y, M, C, and K.

Next, the structure of the units configuring the toner image forming unit 4 will be described. The photosensitive drums 3 are formed in a cylindrical shape of an aluminum base material, the surface of which is coated with a positive charging photosensitive layer. The aluminum base material functions as a ground layer. Gears 31Y, 31M, 31C, and 31K ("gears 31") are provided on side end surfaces of the photosensitive drums 3Y, 3M, 3C, and 3K, respectively, and are engaged with respective gears 32Y, 32M, 32C, and 32K ("gears 32") by which they are driven. The gears 32 for driving the gears 31 are driven by respective simple drive motors (not shown) to rotate simultaneously at the same angular velocity. Consequently, the photosensitive drums 3 are driven to rotate in the clockwise direction.

The chargers 71 are Scorotron chargers disposed below the respective photosensitive drums 3 so as to oppose but not contact the surfaces of the same. The chargers 71 form a uniform positive charge over the surfaces of the photosensitive drums 3. The developing units 51 have casings 55Y, 55M, 55C, and 55K ("casings 55") for accommodating toner. The developing units 51 also include respective developing rollers 52Y, 52M, 52C, and 52K ("developing rollers 52"), supply rollers 53Y, 53M, 53C, and 53K ("supply rollers 53"), and thickness regulating blades 54Y, 54M, 54C, and 54K ("thickness regulating blades 54").

The developing rollers 52 are cylindrical in shape and constructed of an elastic base material, such as a conductive silicon rubber or a conductive urethane rubber, the surface of which is coated with a resin or rubber material containing fluorine. The supply rollers 53 are formed of a conductive sponge roller and are disposed so as to contact the developing rollers 52 with pressure applied by the elastic force of the sponge roller. The supply rollers 53 may be configured of an appropriate foam member formed of a conductive silicon rubber, EPDM, or urethane rubber.

Each of the thickness regulating blades 54 has a base end formed of stainless steel or the like in a plate shape that is fixed to the respective casing 55, and a free end formed of an insulating silicon rubber or an insulating rubber or synthetic resin containing fluorine. The free end of the thickness regulating blades 54 contacts the respective developing roller 52 with pressure.

The supply rollers 53 in the developing units 51 supply toner accommodated in the respective casings 55 to the respective developing rollers 52. The thickness regulating blades 54 regulate the toner on the surfaces of the developing rollers 52 so that a uniform thin layer is carried thereon. Hence, after the scanning unit 100 forms electrostatic latent images on the surfaces of the photosensitive drums 3 by scanning a laser beam over these surfaces, the developing rollers 52 develop the electrostatic latent images with toner according to a reverse developing method.

The color laser printer 1 also includes transfer rollers 61Y, 61M, 61C, and 61K ("transfer rollers 61") disposed below the respective photosensitive drums 3 and on the inside of the paper conveying belt 60 so that the paper conveying belt 60 is interposed between the photosensitive drums 3 and the transfer rollers 61. The transfer rollers 61 apply a transfer bias that causes toner images developed on the surfaces of the photosensitive drums 3 to be transferred sequentially onto the sheet of recording paper P conveyed on the top surface of the paper conveying belt 60.

The fixing unit 8 is provided with a heating roller 81, and a pressure roller 82 disposed so as to contact the entire length of the heating roller 81 with pressure. After toner images in each color Y, M, C, and K have been transferred onto the sheet of recording paper P, the heating roller 81 fixes the toner images to the recording paper P with heat as the recording paper P passes between the heating roller 81 and pressure roller 82. After passing through the fixing unit 8, the recording paper P is discharged onto the paper discharge tray 10 provided on the top surface of the color laser printer 1.

(2) Structure of the Scanning Unit 100

Figure 2:
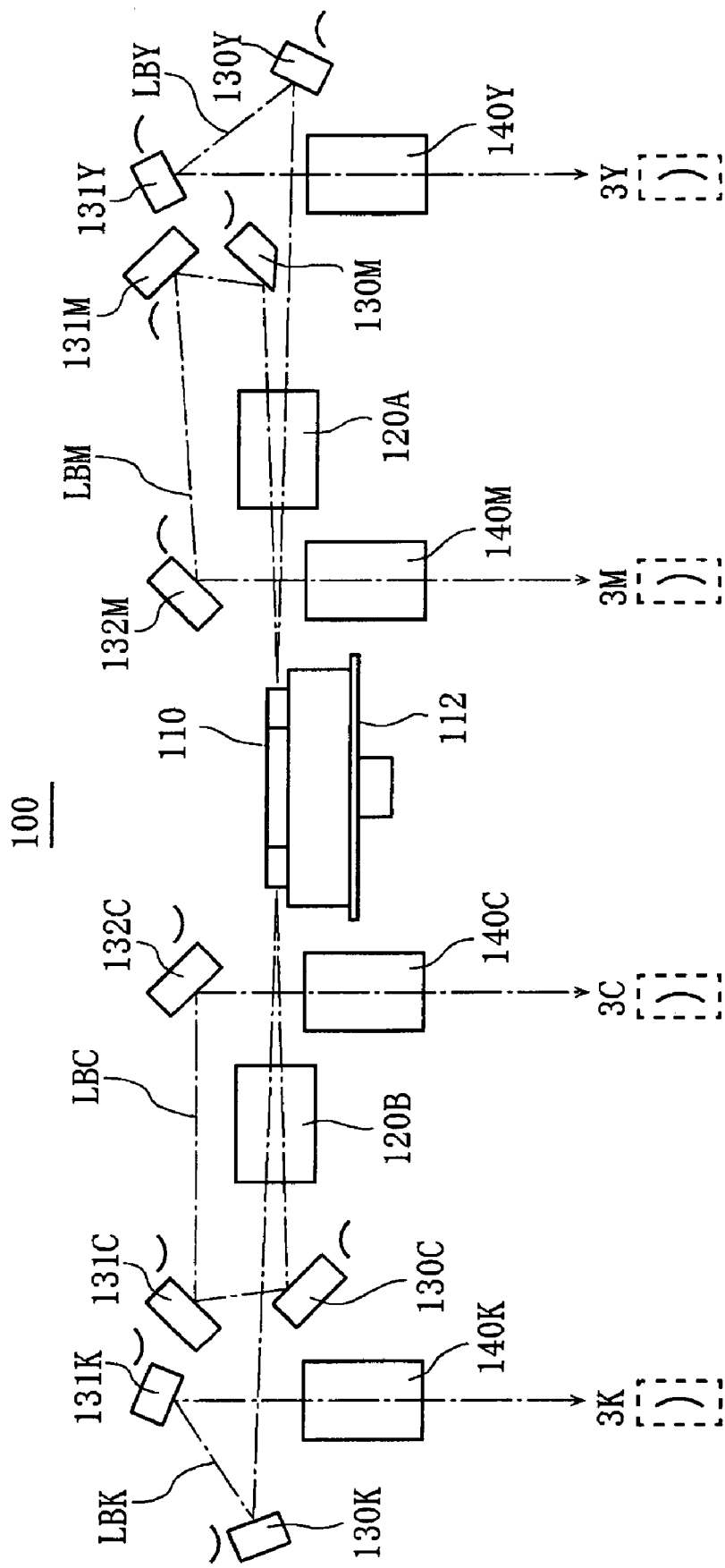
FIG. 2 is an explanatory side view showing a scanning unit according to an embodiment of the invention.
Figure 3:
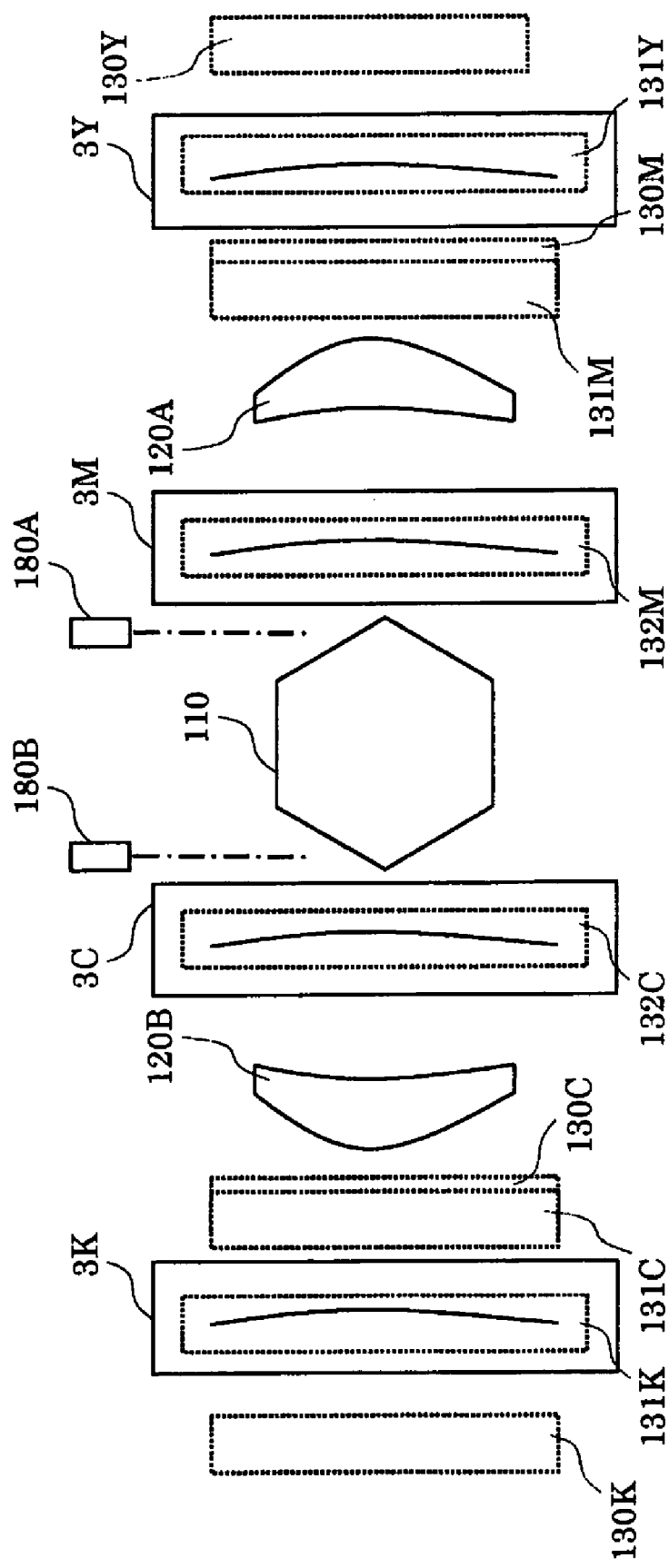
FIG. 3 is an explanatory top view showing the scanning unit in FIG. 2.

Next, the structure of the scanning unit 100 according to the preferred embodiment will be described. FIG. 2 is an explanatory diagram illustrating the structure of the scanning unit 100 when viewed from the side. FIG. 3 shows the components constituting the scanning unit 100 and the photosensitive drums 3 when viewed from above. In FIG. 3, reflecting mirrors are denoted by dotted lines, and the orientation of the scan line curves on each of the photosensitive drums 3 are shown to be identical. The scanning unit 100 is configured of the various components shown in FIG. 2 that are mounted on a frame (not shown) formed of a molded resin.

The scanning unit 100 has a plurality (six in the example of FIG. 3) of reflecting surfaces. A polygon mirror 110 is disposed in the central region of the scanning unit 100 with respect to the horizontal. A polygon motor 112 is provided for driving the polygon mirror 110 to rotate at a high speed. As shown in FIG. 3, light-emitting units 180A and 180B are disposed two on each side of the polygon mirror 110, each of which emits a laser beam onto a reflecting surface of the polygon mirror 110 so as to be obliquely incident on the surface. Here, obliquely incident signifies that the laser beams are irradiated diagonally upward and downward onto the reflecting surfaces of the polygon mirror 110 from different sides of a plane orthogonal to the rotational axis of the polygon mirror 110. The plane orthogonal to the rotational axis of the polygon mirror 110 refers to an imaginary plane parallel to the surface of the paper in FIG. 3. One light source on each side of the polygon mirror 110 is positioned above this plane and the other below. The one above irradiates light downward at an angle so as to strike the reflecting surface of the polygon mirror diagonally downward, while the one below irradiates light at an upward angle. The imaginary plane intersects the reflecting surfaces of the polygon mirror 110 and divides a spatial area in which the polygon mirror 110 is disposed into an upper part and a lower part. Hence, laser beams irradiated upward from a position diagonally below the polygon mirror 110 that are incident on the reflecting surface thereof proceed upward after being reflected off the reflecting surface (LBM and LBK in FIG. 2), while laser beams irradiated downward from a position diagonally above the polygon mirror 110 that are incident on the reflecting surface thereof proceed downward after being reflected off the reflecting surface (LBY and LBC in FIG. 2).

Optical scanning systems corresponding to the laser beam LBY scanned over the photosensitive drum 3Y and the laser beam LBM scanned over the photosensitive drum 3M are disposed on the right side of the polygon mirror 110 in FIG. 2, while optical scanning systems corresponding to the laser beam LBC for scanning the photosensitive drum 3C and the laser beam LBK for scanning the photosensitive drum 3K is disposed on the left side of the polygon mirror 110. The optical scanning systems include fe lenses lens 120A and 120B, respectively, for scanning the respective photosensitive members at a constant speed while converging the laser beams in the main scanning direction. The lens 120A is shared by laser beams LBY and LBM, and the lens 120B is shared by laser beams LBC and LBK.

In the preferred embodiment, cylindrical lenses 140Y, 140M, 140C, and 140K (cylindrical lenses 140) are provided for each color for converging the respective laser beams in a subscanning direction (rotational direction of the photosensitive drums) orthogonal to the main scanning direction. Reflecting mirrors 130Y, 130M, 130C, 130K, 131Y, 131M, 131C, 131K, 132M, and 132C are provided for guiding the laser beams for each color so that the laser beam passes through the respective cylindrical lens 140 and strikes the surface of the respective photosensitive drum 3 after reflecting off a surface of the polygon mirror 110 and passing through one of the lenses 120A and 120B.

Hence, the color laser printer of the present invention has optical reflecting systems configured of these reflecting mirrors for guiding the laser beams for each color to the respective photosensitive drum. Specifically, the optical reflecting systems of the preferred embodiment are configured of the reflecting mirrors 130Y and 131Y for guiding the laser beam LBY to the photosensitive drum 3Y; the reflecting mirrors 130M, 131M, and 132M for guiding the laser beam LBM to the photosensitive drum 3M; the reflecting mirrors 130C, 131C, and 132C for guiding the laser beam LBC to the photosensitive drum 3C; and the reflecting mirrors 130K and 131K for guiding the laser beam LBK to the photosensitive drum 3K.

In the preferred embodiment, the optical reflecting system that guides the laser beam LBY to the photosensitive drum 3Y after the laser beam LBY has reflected off a surface of the polygon mirror 110 in a direction diagonally downward and has passed through the lens 120A is referred to as a first optical reflecting system; the optical reflecting system that guides the laser beam LBM to the photosensitive drum 3M after the laser beam LBM has reflected off the same reflecting surface of the polygon mirror 110 in a direction diagonally upward and has passed through the lens 120A is called a second optical reflecting system; the optical reflecting system that guides the laser beam LBC to the photosensitive drum 3C after the laser beam LBC has reflected off another reflecting surface of the polygon mirror 110 in a direction diagonally downward and has passed through the lens 120B is called a third optical reflecting system; and the optical reflecting system that guides the laser beam LBK to the photosensitive drum 3K after the laser beam LBK has reflected off the same reflecting surface of the polygon mirror 110 diagonally upward and has passed through the lens 120B is called a fourth optical reflecting system. Hence, the first and third optical reflecting systems guide laser beams that have been reflected downward, while the second and fourth optical reflecting systems guide laser beams that have been reflected upward.

When irradiating a plurality of laser beams obliquely onto the same reflecting surface of the polygon mirror 110, as in the scanning unit 100 of the preferred embodiment, the distance that the laser beam travels to the fθ lens 120 after being reflected by the polygon mirror 110 differs between the central area in the main scanning direction and the end areas in the main scanning direction. Hence, by the time the laser beam reaches the respective first reflecting mirror 130, the scan line formed by the laser beam is in the shape of a curve.

In FIG. 2, an arc symbol has been included near each reflecting mirror to indicate the orientation of the curved scan line. The arc symbol represents the shape of the scan line when looking at the reflecting mirror in the direction that the laser beam travels. For example, the laser beams LBM and LBK that proceed upward after reflecting off the polygon mirror 110 form scan lines that curve upward toward the ends in the main scanning direction when the laser beams have passed through the fθ lens 120A or 120B and have reached the respective reflecting mirror 130M or 130K. In contrast, the laser beams LBY and LBC that proceed downward after reflecting off the polygon mirror 110 form scan lines that curve downward toward the ends in the main scanning direction.

If the orientation of these curved scan lines are not the same on all the photosensitive drums, registration problems may occur in the color image formed on the recording medium, leading to a decline in image quality. To avoid this problem, each laser beam is provided with either an even number or an odd number of reflecting mirrors in the preferred embodiment in order to achieve the same rotation of the curved scan lines on the photosensitive drums.

More specifically, when the number of optical reflecting elements constituting the first optical reflecting system is odd, then an even number of optical reflecting elements is used to configure the second and third optical reflecting systems, while an odd number of optical reflecting elements is used to configure the fourth optical reflecting system. When the number of optical reflecting elements constituting the first optical reflecting system is even, then an odd number of optical reflecting elements is used to configure the second and third optical reflecting systems, while an even number of optical reflecting elements is used to configure the fourth optical reflecting system.

Since the first optical reflecting system corresponding to the laser beam LBY in the example of FIG. 2 is configured of two (an even number) reflecting mirrors, the second and third optical reflecting system corresponding to laser beams LBM and LBC are configured of three (an odd number) reflecting mirrors, while the fourth optical reflecting system corresponding to the laser beam LBK is configured of two (an even number) reflecting mirrors. With this configuration, the curved scan lines formed on the photosensitive drums 3 all have the same orientation. However, the first optical reflecting system may also be configured of an odd number of reflecting mirrors. In order to produce curved scan lines having the same orientation in this case, the second and third optical reflecting systems should be configured of an even number of reflecting mirrors, while the fourth optical reflecting system should be configured of an odd number of reflecting mirrors.

When a plurality of laser beams are irradiated so as to be obliquely incident on the same reflecting surface of the polygon mirror 110, the angles formed between the laser beams should be small in order to achieve high image quality. Generally, it is preferable that the angle be 3° or less (refer to Japanese Patent Application Publication No. 2004-21133, for example). However, when a small angle is formed between the laser beams LBM and LBY, for example, the first reflecting mirror provided in the second optical reflecting system (the reflecting mirror 130M in the embodiment) interferes with the progress of the laser beam LBY unless some measure is taken because the reflecting mirror must be formed with some degree of thickness in order to maintain a flat reflecting surface.

In the example of FIG. 2, the reflecting mirror 130C is provided for the lower laser beam on the lens 120B side and therefore does not conflict with the laser beam LBK. However, the reflecting mirror 130M on the lens 120A side must be provided for the upper laser beam in order to produce curved scan lines having the same orientation on the photosensitive drums. Hence, unless some measure is taken, the laser beam LBY will be reflected by the reflecting mirror 130M.

In the embodiment, a portion of the reflecting mirror 130M in the second optical reflecting system has been cut away, as shown in FIG. 2 so as not to interfere with the passage of the laser beam LBY.

However, the measure for allowing passage of the laser beam LBY is not limited to the cutout construction shown in FIG. 2. For example, as shown in FIG. 4, the reflecting mirror 130M may be an optical reflecting element configured so that only the upper region is a reflecting region for reflecting the laser beam LBM, while the lower region is a transmitting region that allows the laser beam LBY to pass therethrough.

While it is preferable to apply a coating to the reflecting mirror 130M that enhances transmittance in the lower region of the lens in order to prevent a loss of image quality caused when the laser beam LBY reaches the photosensitive drum 3M, it is difficult to apply coating that sufficiently enhances transmittance so as to prevent all reflection of the laser beam LBY off the reflecting mirror 130M. However, in some cases, slight reflection of the laser beam LBY does not lead to a reduced image quality depending on the sensitivity of the photosensitive drum. Applying a coating to raise transmittance in the lower region is particularly preferable in such cases.

Figure 4:
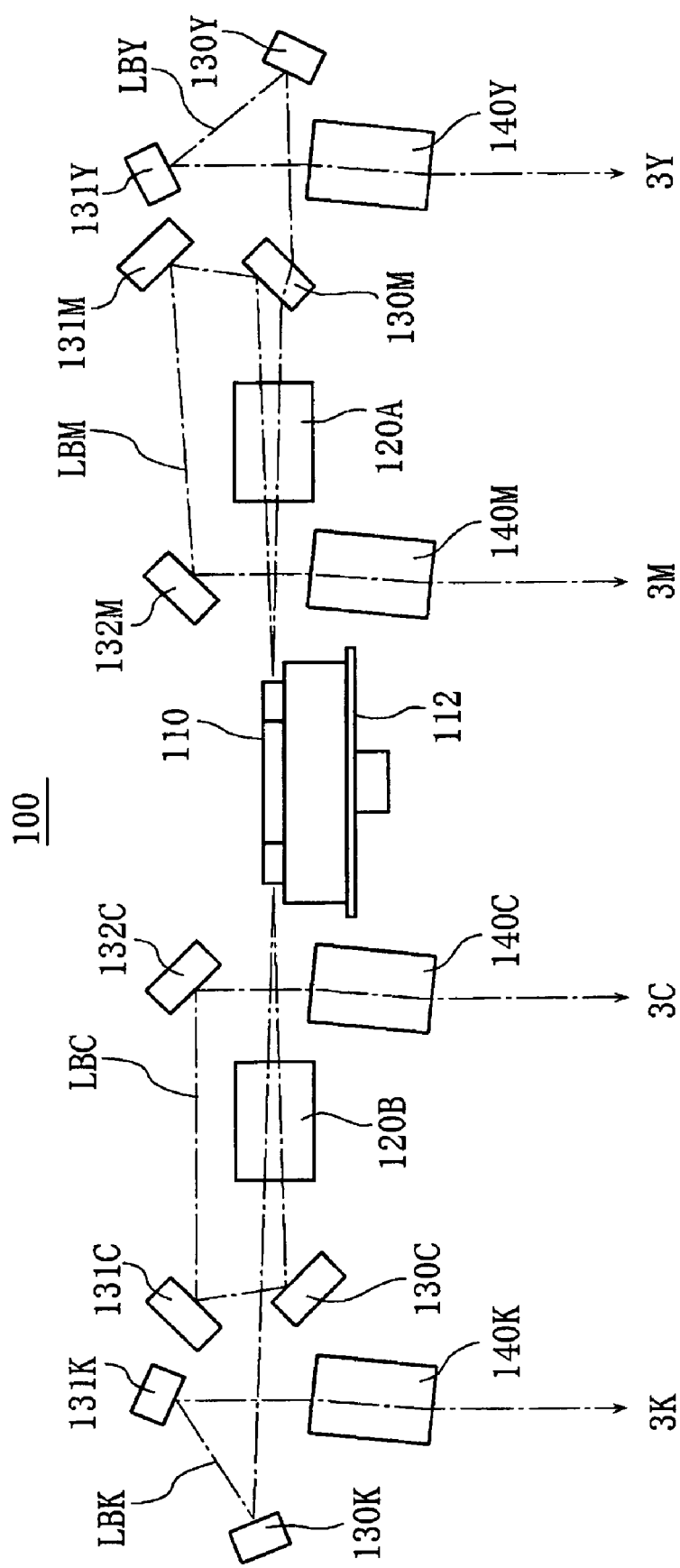
FIG. 4 is an explanatory side view showing a modification of the scanning unit.

In the example of FIG. 4, the cylindrical lenses 140 are arranged so that their optical axes are similarly inclined in the subscanning direction orthogonal to the main scanning direction of the laser beam. This configuration can reduce the magnitude of the curvature (bowing) in the scan lines and is preferable for reducing problems in color registration. While it is obviously desirable to provide a mechanism for each of the cylindrical lenses 140 for adjusting their inclinations separately, it is also possible to provide a single mechanism for simultaneously adjusting the inclinations for all four cylindrical lenses when the orientation of all curved scan lines is the same, as in the preferred embodiment.

While the invention has been described in detail with reference to specific embodiments thereof, it would be apparent to those skilled in the art that many modifications and variations may be made therein without departing from the spirit of the invention, the scope of which is defined by the attached claims.

It is also conceivable to configure the reflecting mirror 130M with a half mirror. In this case, the laser beam LBY reflects off the reflecting mirror 130M. However, by adjusting the positions and angles of the reflecting mirrors 131M and 132M so that the laser beam LBY does not reach the photosensitive drum 3M, it is possible to prevent a loss of image quality. It is also possible to adjust the wavelengths of the laser beams so that the reflectance of only one laser beam is enhanced.

The present invention can be applied to an image-forming device having a polygon mirror or other deflecting means with reflecting surfaces on which a plurality of laser beams are obliquely incident; a scanning unit provided in this image-forming device; and the like.

What is claimed is:
1. An image-forming device comprising:
   a plurality of photosensitive members including first to fourth photosensitive members;
   a polygon mirror rotatable about a rotational axis and having a plurality of reflecting surfaces including a first reflecting surface and a second reflecting surface, and an imaginary plane orthogonal to the rotational axis, the imaginary plane intersecting the plurality of reflecting surfaces and dividing a spatial area in which the polygon mirror is disposed into a first part and a second part;
   a first plurality of light sources that is disposed in the first part and irradiates one or more light beams diagonally toward the second part to strike each of the first and second reflecting surfaces of the polygon mirror;
   a second plurality of light sources that is disposed in the second part and irradiates one or more light beams diagonally toward the first part to strike each of the first and second reflecting surfaces of the polygon mirror;
   a first fθ lens that transmits the light beams reflected off the first reflection surface;
   a second fθ lens that transmits the light beams reflected off the second reflection surface;
   a first optical reflecting system including a predetermined number of optical reflecting elements successively disposed along an optical path between the first fθ lens and the first photosensitive member;
   a second optical reflecting system including a predetermined number of optical reflecting elements successively disposed along an optical path between the first fθ lens and the second photosensitive member;
   a third optical reflecting system including a predetermined number of optical reflecting elements successively disposed along an optical path between the second fθ lens and the third photosensitive member; and
   a fourth optical reflecting system including a predetermined number of optical reflecting elements succes- sively disposed along an optical path between the second fθ lens and the fourth photosensitive member; wherein the one or more light beams emanated from the first plurality of light sources and irradiated onto the first reflecting surface of the polygon mirror are incident on the first fθ lens, the one or more light beams emanated from the second plurality of light sources and irradiated onto the first reflecting surface of the polygon mirror are incident on the first fθ lens, the one or more light beams emanated from the first plurality of light sources and irradiated onto the second reflecting surface of the polygon mirror are incident on the second fθ lens, and the one or more light beams emanated from the second plurality of light sources and irradiated onto the second reflecting surface of the polygon mirror are incident on the second fθ lens; wherein if the first optical reflecting system includes an odd number of optical reflecting elements, each of the second and third optical reflecting systems includes an even number of optical reflecting elements and the fourth optical reflecting system includes an odd number of optical reflecting elements whereas if the first optical reflecting system includes an even number of optical reflecting elements, each of the second and third optical reflecting systems includes an odd number of optical reflecting elements and the fourth optical reflecting system includes an even number of optical reflecting elements.

2. The image-forming device according to claim 1, wherein at least one of the optical reflecting elements disposed in an initial position of the second and fourth optical reflecting systems is positioned nearer the reflecting surface of the polygon mirror than an optical reflecting element disposed at an initial position in the optical reflecting system that guides another light beam passing through the same fθ lens, and has a cutout part so as not to interfere with the passage of the other light beam.

3. The image-forming device according to claim 1, wherein at least one of the optical reflecting elements disposed in an initial position of the second and fourth optical reflecting systems is positioned nearer the reflecting surface of the polygon mirror than an optical reflecting element disposed at an initial position in the optical reflecting system that guides another light beam passing through the same fθ lens, and has a transmitting region for transmitting the other light beam.

4. The image-forming device according to claim 1, wherein at least one of the optical reflecting elements disposed in an initial position of the second and fourth optical reflecting systems is a half mirror positioned nearer the reflecting surface of the polygon mirror than an optical reflecting element disposed at an initial position in the optical reflecting system that guides another light beam passing through the same fθ lens, and the remaining optical reflecting elements configuring the optical reflecting system that includes the half mirror are arranged at positions and angles such that the other light beam reflected off the half mirror does not reach the photosensitive member corresponding to the optical reflecting system with the half mirror.

5. The image-forming device according to claim 1, further comprising a plurality of scanning lenses equal in number to the light beams directed toward the plurality of photosensitive members, the plurality of scanning lenses having respective optical axes and converging the respective light beams while scanning the light beams over the corresponding photosensitive members, wherein the plurality of scanning lenses is arranged at inclinations such that the optical axes of the plurality of scanning lenses have substantially the same orientation with respect to a subscanning direction orthogonal to a main scanning direction of the light beam.

6. The image-forming device according to claim 5, wherein each of the plurality of scanning lenses comprises a cylindrical lens.

7. The image-forming device according to claim 1, wherein the first and second reflecting surfaces are opposing surfaces on the polygon mirror.

8. A scanning unit for an image-forming device, the scanning unit comprising:
a polygon mirror rotatable about a rotational axis and having a plurality of reflecting surfaces including a first reflecting surface and a second reflecting surface, and an imaginary plane orthogonal to the rotational axis, the imaginary plane intersecting the plurality of reflecting surfaces and dividing a spatial area in which the polygon mirror is disposed into a first part and a second part;
a first plurality of light sources that is disposed in the first part and irradiates one or more light beams diagonally toward the second part to strike each of the first and second reflecting surfaces of the polygon mirror;
a second plurality of light sources that is disposed in the second part and irradiates one or more light beams diagonally toward the first part to strike each of the first and second reflecting surfaces of the polygon mirror;
a first fθ lens that transmits the light beams reflected off the first reflection surface;
a second fθ lens that transmits the light beams reflected off the second reflection surface;
a first optical reflecting system including a predetermined number of optical reflecting elements successively disposed along an optical path between the first fθ lens and a first position;
a second optical reflecting system including a predetermined number of optical reflecting elements successively disposed along an optical path between the first fθ lens and a second position;
a third optical reflecting system including a predetermined number of optical reflecting elements successively disposed along an optical path between the second fθ lens and a third position; and
a fourth optical reflecting system including a predetermined number of optical reflecting elements successively disposed along an optical path between the second fθ lens and a fourth position;
wherein the one or more light beams emanated from the first plurality of light sources and irradiated onto the first reflecting surface of the polygon mirror are incident on the first fθ lens, the one or more light beams emanated from the second plurality of light sources and irradiated onto the first reflecting surface of the polygon mirror are incident on the first fθ lens, the one or more light beams emanated from the first plurality of light sources and irradiated onto the second reflecting surface of the polygon mirror are incident on the second fθ lens, and the one or more light beams emanated from the second plurality of light sources and irradiated onto the second reflecting surface of the polygon mirror are incident on the second fθ lens;
wherein if the first optical reflecting system includes an odd number of optical reflecting elements, each of the second and third optical reflecting systems includes an even number of optical reflecting elements and the fourth optical reflecting system includes an odd number of optical reflecting elements whereas if the first optical reflecting system includes an even number of optical reflecting elements, each of the second and third optical reflecting systems includes an odd number of optical reflecting elements and the fourth optical reflecting system includes an even number of optical reflecting elements.

9. The scanning unit according to claim 8, wherein at least one of the optical reflecting elements disposed in an initial position of the second and fourth optical reflecting systems is positioned nearer the reflecting surface of the polygon mirror than an optical reflecting element disposed at an initial position in the optical reflecting system that guides another light beam passing through the same fθ lens, and has a cutout part so as not to interfere with the passage of the other light beam.

10. The scanning unit according to claim 8, wherein at least one of the optical reflecting elements disposed in an initial position of the second and fourth optical reflecting systems is positioned nearer the reflecting surface of the polygon mirror than an optical reflecting element disposed at an initial position in the optical reflecting system that guides another light beam passing through the same fθ lens, and has a transmitting region for transmitting the other light beam.

11. The scanning unit according to claim 8, wherein at least one of the optical reflecting elements disposed in an initial position of the second and fourth optical reflecting systems is a half mirror positioned nearer the reflecting surface of the polygon mirror than an optical reflecting element disposed at an initial position in the optical reflecting system that guides another light beam passing through the same fθ lens, and the remaining optical reflecting elements configuring the optical reflecting system that includes the half mirror are arranged at positions and angles such that the other light beam reflected off the half mirror does not reach the photosensitive member corresponding to the optical reflecting system with the half mirror.

12. The scanning unit according to claim 8, further comprising a plurality of scanning lenses equal in number to the light beams directed toward the first to fourth positions, the plurality of scanning lenses having respective optical axes and converging the respective light beams while scanning the light beams, wherein the plurality of scanning lenses is arranged at inclinations such that the optical axes of the plurality of scanning lenses have substantially the same orientation with respect to a subscanning direction orthogonal to a main scanning direction of the light beam.

13. The scanning unit according to claim 12, wherein each of the plurality of scanning lenses comprises a cylindrical lens.

14. The scanning unit according to claim 8, wherein the first and second reflecting surfaces are opposing surfaces on the polygon mirror.

* * * * *